United States Patent
Le Graverand et al.

(10) Patent No.: US 7,542,298 B1
(45) Date of Patent: Jun. 2, 2009

(54) AUTOMATED MODULAR LIBRARY AND ASSOCIATED METHODS

(75) Inventors: Philippe Y. Le Graverand, Villeneuve-Tolosane (FR); Gerald O'Nions, Toulouse (FR); Charles Milligan, Golden, CO (US)

(73) Assignee: Storage Technology Corporation, Louisville, CO (US)

( * ) Notice: Subject to any disclaimer, the term of this patent is extended or adjusted under 35 U.S.C. 154(b) by 759 days.

(21) Appl. No.: 11/094,651

(22) Filed: Mar. 30, 2005

(51) Int. Cl.
*H05K 5/00* (2006.01)

(52) U.S. Cl. .................. 361/752; 361/685; 414/331.05

(58) Field of Classification Search ......... 700/709–713, 700/214, 218; 361/685, 752, 790, 797, 800; 312/223, 198; 211/162, 175, 94, 40; 214/331.05, 214/331.07, 331.11, 331.18
See application file for complete search history.

(56) References Cited

U.S. PATENT DOCUMENTS

| | | | |
|---|---|---|---|
| 5,341,944 A | 8/1994 | Latino | |
| 5,607,275 A | 3/1997 | Woodruff et al. | |
| 5,761,032 A | 6/1998 | Jones | |
| 6,149,019 A | 11/2000 | Newman | |
| 6,904,005 B2 * | 6/2005 | Emberty et al. | 369/30.31 |

* cited by examiner

*Primary Examiner*—Hung S Bui
(74) *Attorney, Agent, or Firm*—Brooks Kushman, P.C.

(57) ABSTRACT

An automated modular storage library is formed by a plurality of available library elements. Each available library element is selected from a predetermined limited subset of library elements made available for library assembly. This creates a library that is modular by restricting the library elements used during assembly to the limited subset of library elements. According to a partial audit principle, an area where an intervention is to be performed may be physically separated prior to the intervention. After the intervention, the partial audit is conducted in a separated area where the intervention occurred, as the remainder of the library was protected during the intervention by the physical separation.

4 Claims, 7 Drawing Sheets

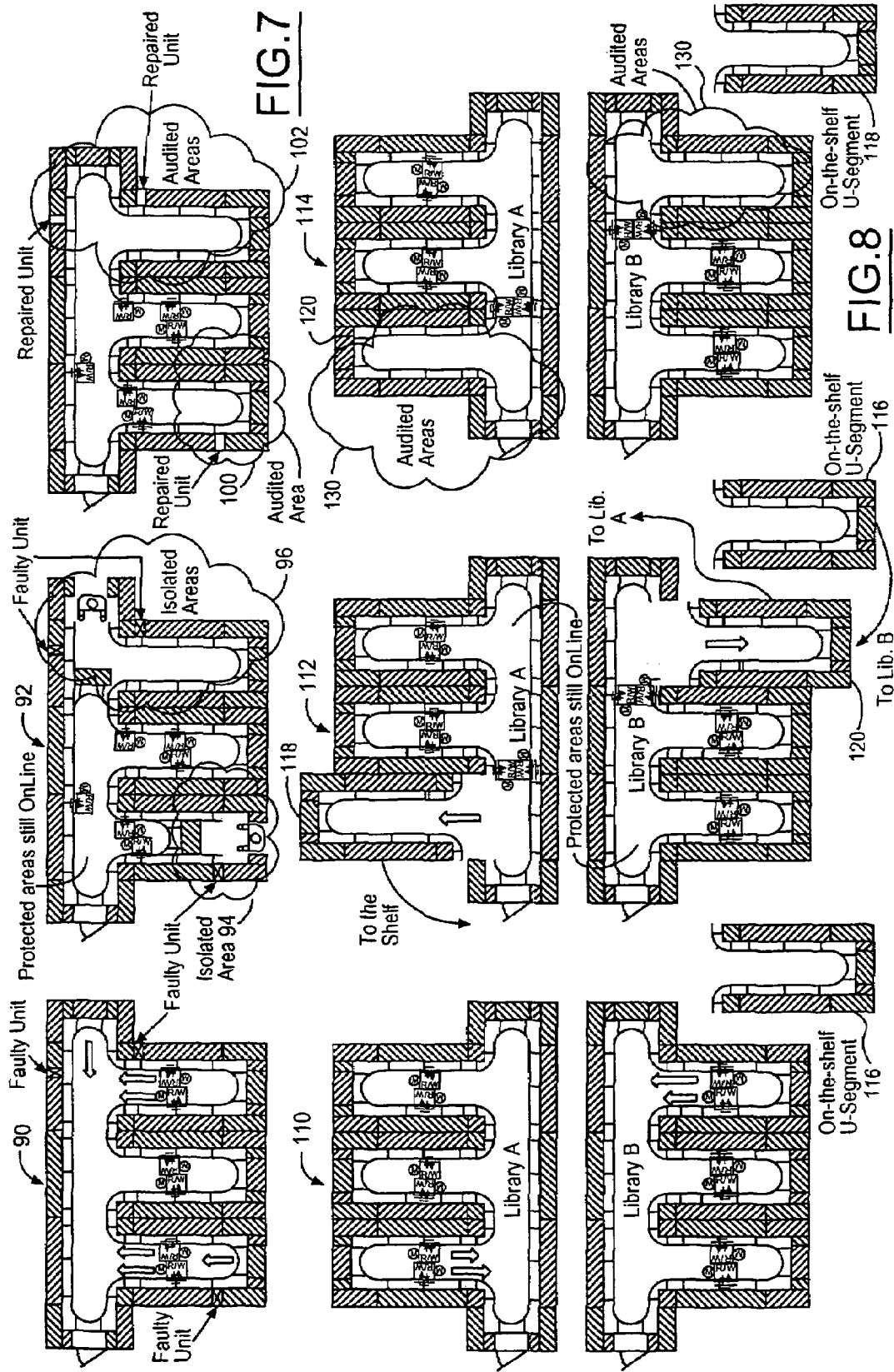

AUTOMATED MODULAR LIBRARY AND ASSOCIATED METHODS

BACKGROUND OF THE INVENTION

1. Field of the Invention

The invention relates to automated storage facilities.

2. Background Art

The portfolio of automated storage facilities covers a large range of storage applications, configurations, options, capacity, etc. However, for customers, it is not easy to modify these elements such as increase their storage capacity or modify the configuration because this process involves either exchanging the current facility, now too small, for a larger model, or involves the addition of companion models be installed in order to extend the facility or change it's configuration.

In this same way, for customers looking to decrease their storage capacity or move the storage facility to a smaller location, the current process leads such customers to either retain the oversized facility or exchange the storage facility for a smaller model.

For customers trying to protect their investments and trying to avoid manipulating stored units or reconfigure their storage facility processes, these aspects of automated storage facilities are not very attractive.

On the other hand, though these problems are addressed and a customer has a facility with ability to change configuration or have a variable capacity to store units, There is still a significant operations problem. For example, when a maintenance or repair operation is performed, it is generally the case that the operators must first stop the entire facility and stop all processes. This leads to a loss of productivity. Further, if when resuming operations after this stop it is required to further wait for an inventory or an audit of the facility's contents to complete, the period of lost productivity can be significantly increased.

Another concern with automated storage facilities, from a supplier standpoint, is that having a large portfolio of automated storage models, developed, manufactured, and maintained is costly unless there are a limited number of parts common to all of the models.

Background information may be found in U.S. Pat. Nos. 5,341,944, 5,607,275, 5,761,032, and 6,149,019.

SUMMARY OF THE INVENTION

It is an object of the invention to allow storage facility configuration changes such as capacity modifications to occur as smoothly as possible without jeopardizing customer investments.

It is another object of the invention to optimize the storage facility inventory/audit process to ensure that the facility offers a high level of productivity to the customer.

In carrying out the invention, an improved automated storage facility is provided. In accordance with the invention, it is possible to provide a more customer oriented automated storage facility while reducing costs.

In accordance with the invention, in order to be able to manage as many configurations as possible, a subset of basic configuration elements are defined. This subset is the foundation for the automated modular storage facility concept.

When assembled together, these basic configuration elements may form either a more complex component (for example assembling a U-segment from the defined foundation subset of basic configuration elements which elements are less complex than the U-segment) or a complete and self-sufficient storage facility.

Put another way, the invention comprises an automated modular storage facility and associated methods. A defined subset of basic configuration elements is made available. The invention involves forming more complex components and/or complete storage facilities from available basic configuration elements. This approach using a limited set of basic configuration elements allows the building of an arbitrarily large number of storage facility configurations, it also allows adapting the storage facility configuration to the size and shape of the warehouse or room in which the facility is installed (e.g., rectangular or square shaped or some irregular form).

Further, in accordance with the invention, a partial inventory/audit principle is comprehended. This means that after an intervention is performed on an automated storage facility constructed in accordance with this invention (modular storage facility) to change configuration (e.g., increase the storage capacity by adding some elements) or to replace some faulty parts, the system management of the facility needs only to audit/inventory a limited portion of the facility instead of performing a full audit.

This partial audit is possible because during an intervention, the modular storage facility is able to physically separate areas where the intervention is performed from the rest of the facility that remains protected and inaccessible to human operators. There is no need to perform an audit/inventory on the protected areas, and at the same time, these areas can remain in use and be available for normal operations during the whole intervention period. The protecting/isolating process may be done in a number of ways, for example, either by positioning face-to-face two robots which act as a kind of folding door, or by translating moving walls of U-turn segments, etc.

The principle of the partial audit and the ways it is implemented during different kinds of interventions/situations may vary.

For example, interventions/situations include those that extend/increase the capacity of the modular storage facility, those performed in order to repair/replace some faulty components, as well as those performed in order to either exchange portions of facilities between facilities (for example, if they are inside different warehouses or rooms) or eject/insert portions of facilities going to/coming from other facilities or from parts or supplies locations.

Further, some other high-level modularization functions are contemplated that could be very useful. One possible high-level modularization function that could be provided is the transfer of storage units from/to specified facility segments or components in order to prepare the insertion, the ejection, or the exchange of one or more of such segments or components. Another possible high-level modularization function that could be provided is the reorganizing (gathering or dispatching) of storage units across segments of the facility according to either storage unit attributes (e.g., types/owners or process related (for example collection all storage units used by a certain process into a specified portion of related segments).

It is understood that the principles of this invention can be applied to a large number of storage facility applications and it is not the intention of the inventors to limit such application by any particular enumerations or examples used in the detailed description. We will use the application of these principles to the construction of a storage facility that stores and manages units of data storage media as the example to describe a preferred embodiment. Such a facility will be called variously an automated library, an automated modular library (AML) or a library. It will be easily appreciated by those skilled in the art that such principles can be applied to other storage facility applications. For example, the facility may be a cartridge library or a media library (including, for example, DVD, holographic, nanotechnology modules, etc.).

BRIEF DESCRIPTION OF THE DRAWINGS

FIG. 7 illustrates the repair/replacement of faulty units and the associated partial audit;

FIG. 8 illustrates the exchange or ejection/insertion of portions of libraries between libraries, and the associated partial audit;

DETAILED DESCRIPTION OF THE PREFERRED EMBODIMENTS

Figure 1:
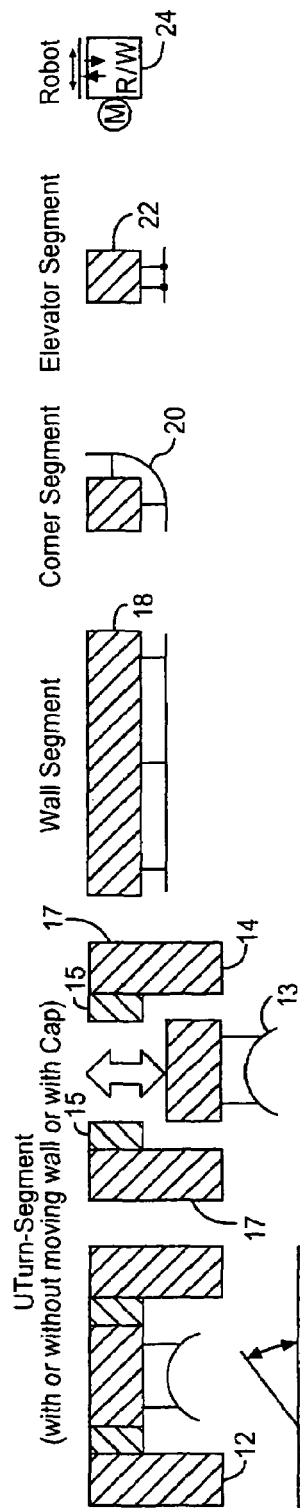
FIG. 1 illustrates basic configuration elements of a modular storage facility, specifically an AML in accordance with a preferred embodiment of the invention.

The basic elements here are shown in the context of a storage facility serviced by rail mounted robots. However, other robot interface techniques can apply and would thereby modify the basic element set according to a set of rules for such robots. It is anticipated that storage units are accessed within the storage facility via robots directed to access and/or move them. With reference to FIG. 1, we show an example of a limited set of basic configuration elements (in the AML these are also known as basic library elements or library elements) that are made available and are sufficient for building all examples of automated storage facilities within a given set of rules. Specifically the example shown applies to building an automated data storage library (AML). In the illustrated implementation, FIG. 1, the basic library elements 13, 15, and 17 are shown in context of building up a more complex library segment. A completed depiction of a U-turn segment 12 is also show (which is assembled as noted by configuring basic library elements 13, 15, and 17). This segment is shown with a moving wall at 14, and shown with a cap at 16. The provided subset of library elements includes short blank wall segment 17, wall mounting shim 15, U-turn element 13, storage wall segment 18 (shown in the context of a rail mount for robots—note that other robot accommodation methods are anticipated and can be likewise configured), corner segment 20, elevator segment 22, and robot 24. It is anticipated that the elements that include rail mount (13, 18, 20, and 22) will allow the storage of storage units (via inclusion of input out put ports known as caps or storage containers called bricks to be described later—see FIG. 9). Generally, an AML may be assembled using the plurality of available library elements. In this way, a library is created that is modular by restricting the library elements used during assembly to the limited subset of basic library elements.

Figure 2:
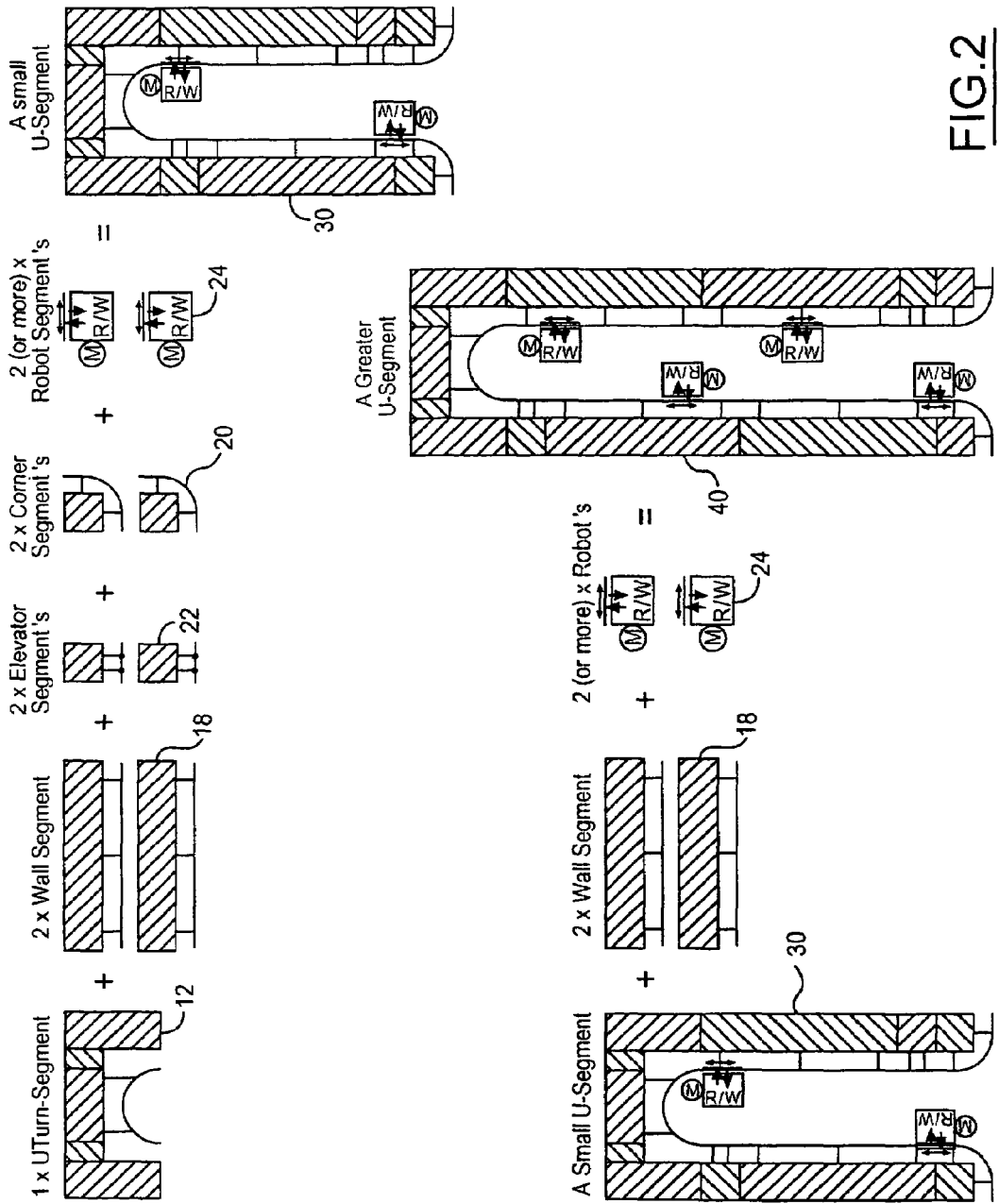
FIG. 2 illustrates the building of more complex component or segment elements by using the basic configuration elements.

In one approach, it is possible to assemble available library elements to form a complete self-sufficient AML from available elements. In another aspect, as best shown in FIG. 2, basic elements could be used for building more complex components. More specifically, FIG. 2 depicts using a U-turn segment 12, wall elements 18, elevator elements 22, corner elements 20, and robots 24 to build a small U-storage segment 30. FIG. 2 further depicts using a small U-storage segment 30, wall elements 18, and additional robots 24 to build a longer U-storage segment 40. In this way, available basic library elements are assembled to form more complex sub-library parts called segments. These more complex sub-library parts may also be made available with members of the limited subset of basic library elements for assembling larger examples of the modular library.

Figure 3:
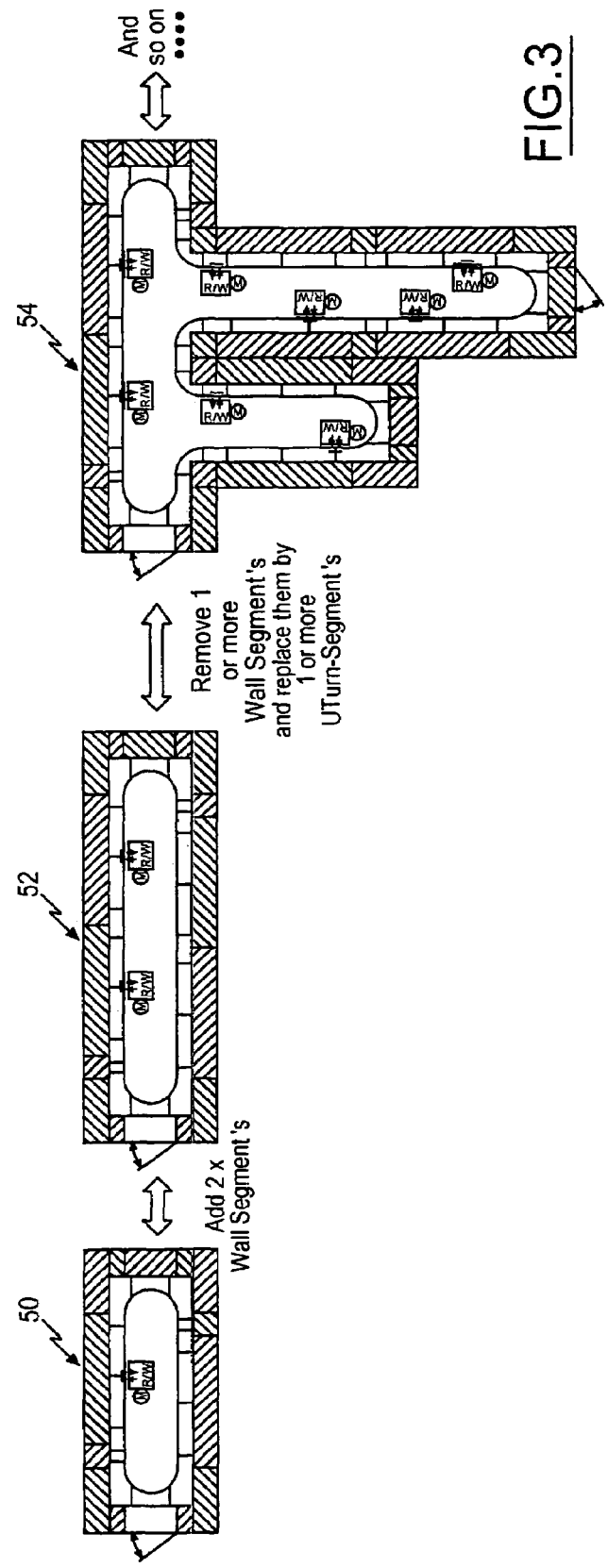
FIG. 3 illustrates building and developing an AML by using basic and/or complex segment elements.

FIG. 3 continues to illustrate the exemplary implementation, and shows building and developing an AML using basic elements and/or complex components or segments. More specifically, structure 50, evolves into structure 52, which further evolves into structure 54, and so on. In this way, the AML could change over time to follow customer storage capacity needs. Put another way, the limited set of basic elements allows the building of an arbitrarily large number of library configurations. This allows adapting the library configuration to the warehouse room size and shape (for example, rectangular or square shaped or some irregular form), among other advantages.

The invention also provides a method of using these modular libraries that involves a partial audit. The partial audit principle is exemplified in FIGS. 4-8.

According to the partial audit principle, after an intervention is performed on a modular storage facility such as an AML, either to increase the capacity by adding some elements or to replace some faulty parts, the system management of the AML needs to audit/inventory only a limited portion of the library instead of performing a full audit. This partial audit is possible because during an intervention, the AML operates to physically separate areas where the intervention is performed from the rest of the library. In this way, the rest of the library may remain protected and inaccessible to human operators during the intervention. Accordingly, there is no need to perform an audit/inventory on the protected areas, and at the same time, these areas can remain online and be available for operations during the intervention period. The protecting/isolating process may be implemented in any suitable way. For example, by positioning two face-to-face robots which act as a kind of folding door, or by moving walls of U-turn segments. The interventions/situations illustrated in the drawings are non-exhaustive, and the number of possibilities are again arbitrarily large.

Figure 4:
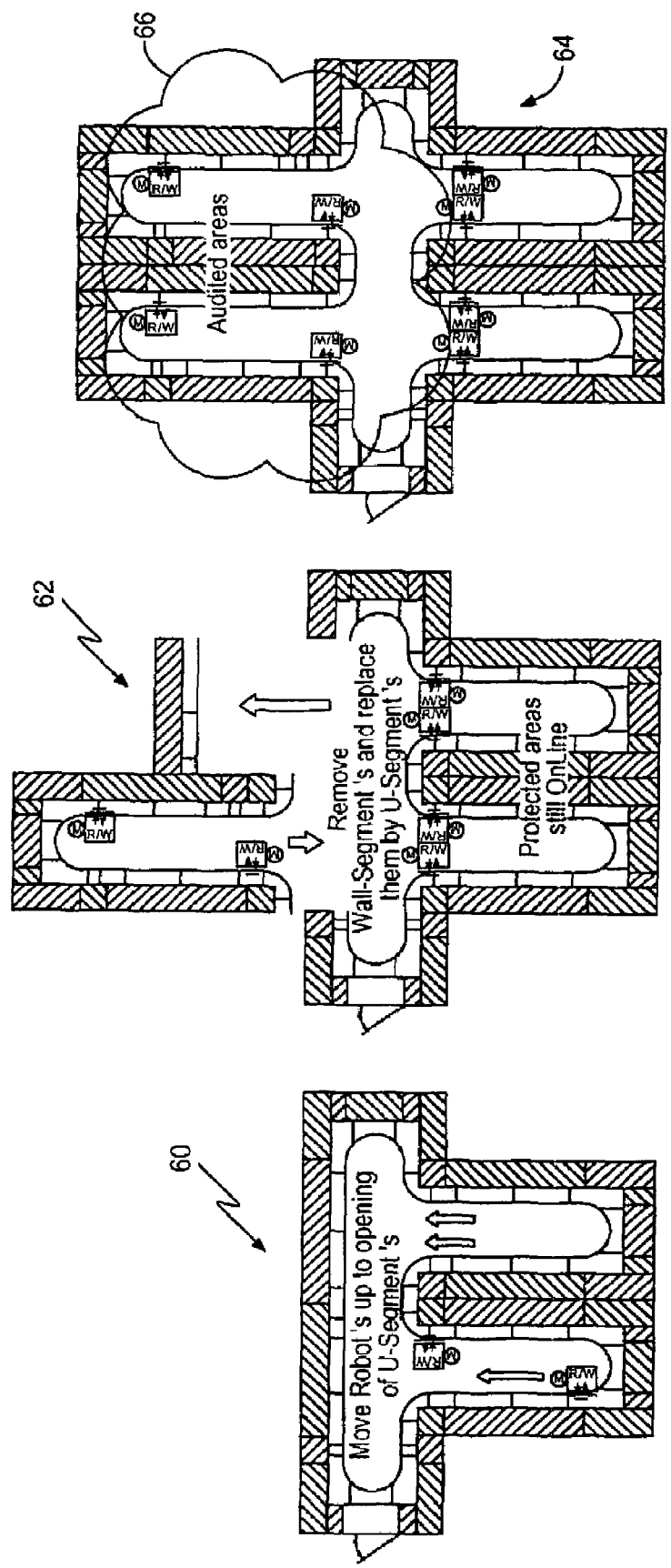
FIG. 4 illustrates the increasing or extending of AML capacity, and illustrates performing a partial audit/inventory that need only cover the non-protected and added areas of the AML.

In FIG. 4, an intervention is performed to increase/extend AML capacity. After intervention, only non-protected and added areas are audited by system management of the AML, and during the intervention protected areas of the library remain online. At 60, robots are moved to the openings of the U-segments. At 62, the intervention is performed by removing wall segments and replacing them with U-segments. The new AML configuration is indicated at 64, and the audit areas are indicated at 66.

Figure 5:
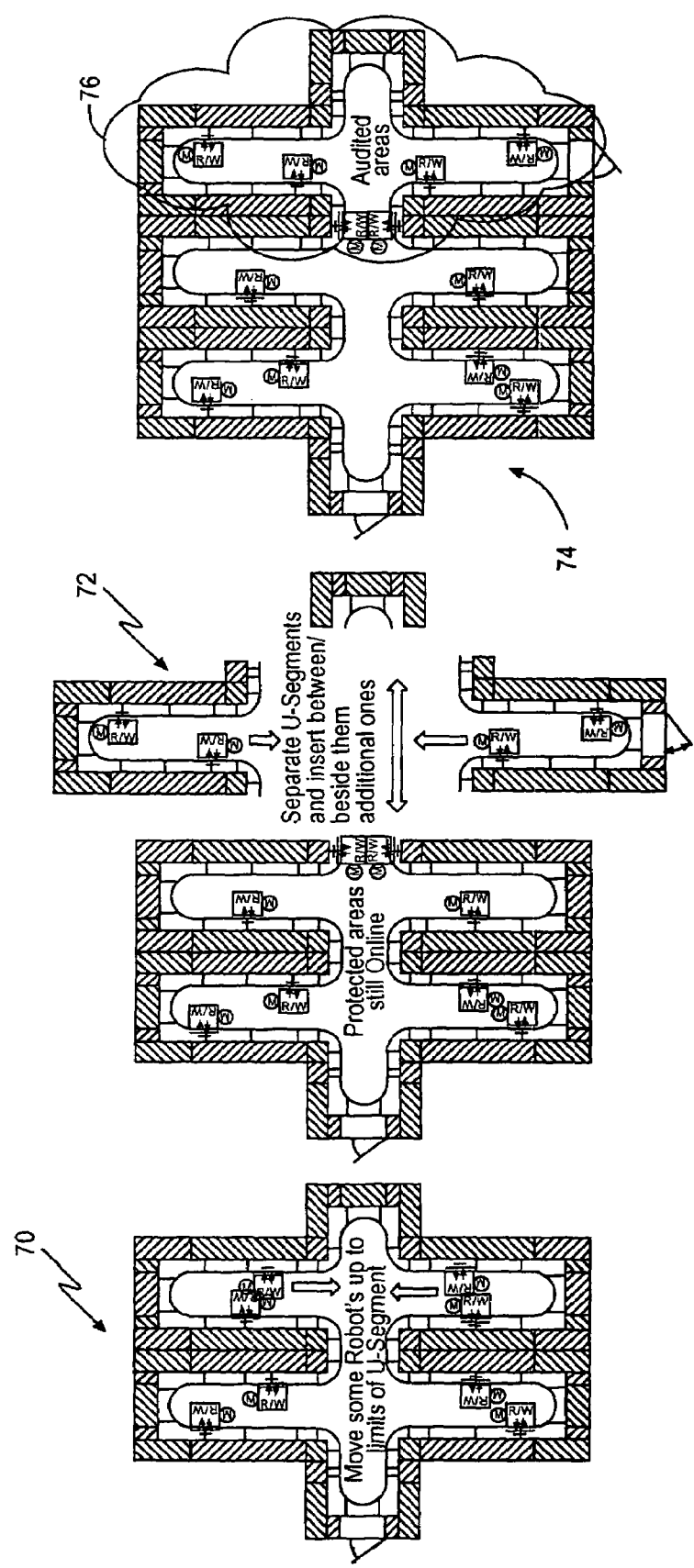
FIGS. 5 and 6 illustrate additional examples of increasing or extending AML capacity and the associated partial audit.

FIG. 5 illustrates another example. In this example, the moving of the robots is shown at 70, and the extension of the library is shown at 72. The new AML configuration is shown at 74, with the audited areas indicated at 76.

Figure 6:
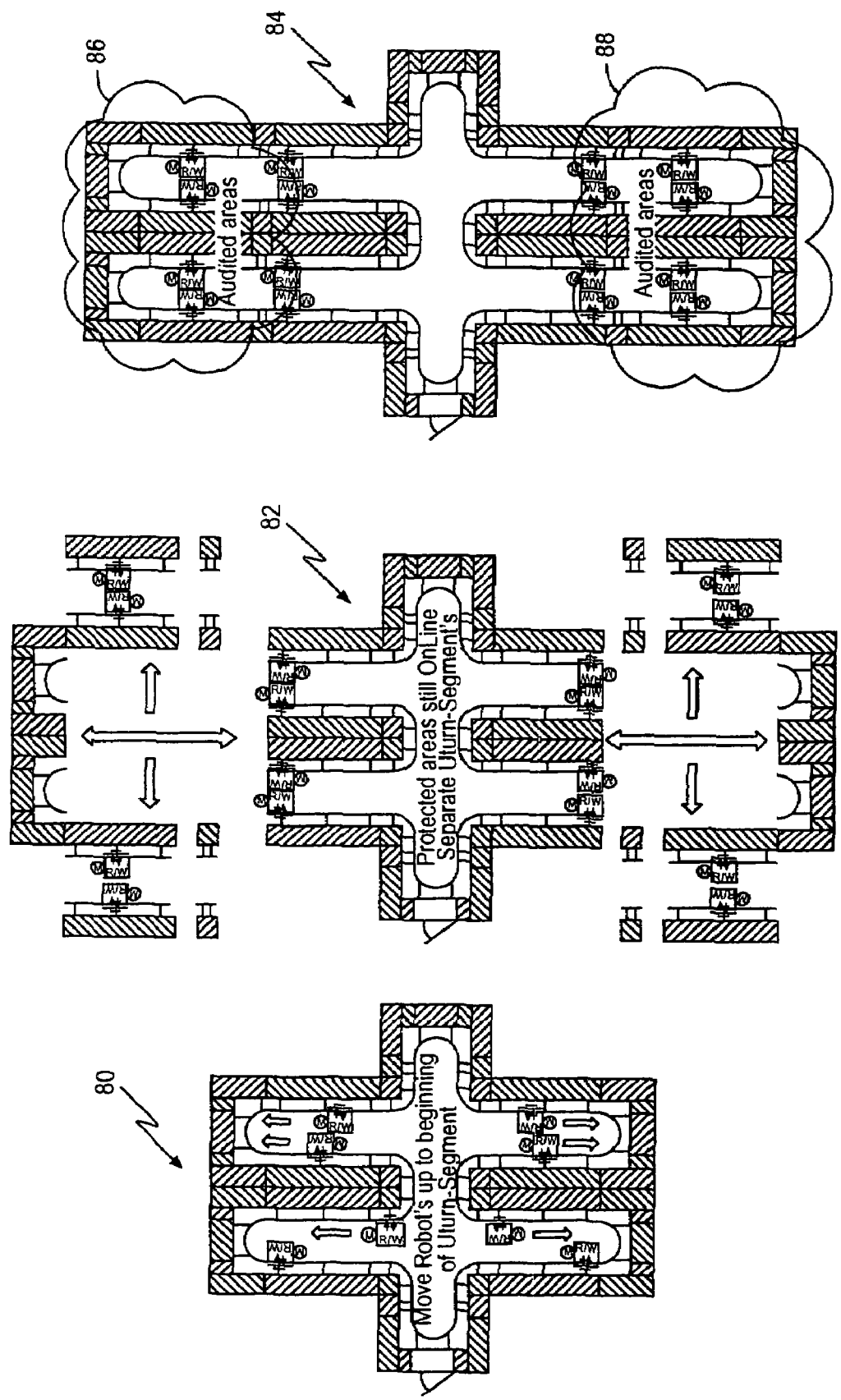

FIG. 6 illustrates yet another example. In FIG. 6, moving the robots is depicted at 80. Increasing/extending the library is indicated at 82. The new library configuration is indicated at 84, with the audit areas indicated at 86 and 88.

Another type of intervention that is possible is an intervention performed in order to repair/replace some faulty units. FIG. 7 depicts this type of intervention. Again, after intervention, only isolated areas are audited by system management of the AML, and during the intervention protected areas of the library remain online. The moving of wall segments to isolate certain areas of the AML is shown at 90. The AML with isolated portions is indicated at 92. Isolated area 94 and isolated area 96 may be serviced to repair/replace faulty units. After intervention, the repaired AML is shown at 98, with the audit areas indicated at 100 and 102.

Finally, FIG. 8 depicts interventions performed in order to either exchange portions of libraries between libraries (for example, if they are inside different cartridge warehouses) or eject/insert portions of libraries going to/coming from other libraries or shelves. More specifically, library A and library B are generally indicated at 110 prior to any intervention, and a nearby on-the-shelf U-segment is indicated at 116. The intervention is generally indicated at 112. As shown, the intention is to move on-the-shelf U-segment 116 to library B, move U-segment 120 from library B to library A, and move U-segment 118 from library A to the shelf. The final library configuration is indicated at 114, with the U-segments in their new positions. The audited areas are appropriately indicated at 130. The segment 116 could also be provided with closures at the open end such as positioned robots that make it an area that does not need to be audited after the insertion as long as the metadata related to contents accompanies the insertion— the same is true for the segment 120 being moved between libraries.

Further, some other high-level modularization functions are contemplated that could be very useful. One high-level modularization function that could be provided is the transfer of media from/to specified library segments in order to prepare the system for insertion into, ejection from, or the exchange of one or more segments between libraries. Another possible high-level modularization function that could be provided is the reorganizing (gathering or dispatching) of media across a number of library segments according to metadata controls such as data type/owners or application related (for example, dispatch media containing striped data across independent library segments in order to ensure the permanent availability of the minimal set of media needed for reconstructing the data).

There are many advantages associated with embodiments of the invention. It is appreciated that a single brick-like basic element may be used to house units that need to be stored in a modular storage facility such as storage media in an AML and also build the walls for a large number of different libraries. The value to the industry comes about because using a single component in a wide variety of configurations and applications significantly increases the production volumes of that component. Volume production means one can achieve cost reductions due to the higher volumes. Storage facilities such as these libraries constructed with such components will cost less than libraries requiring many different components.

Figure 9:
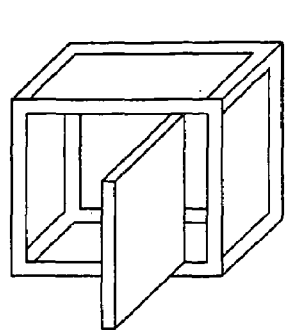
FIG. 9 is a single brick-like basic configuration element that may be used to house media and to build the walls for a large number of different libraries.

A scalable range of libraries can be created using just the one basic component. A simple embodiment of the brick would be a hollow plastic molding with one open face used for inserting and extracting media (or in some cases drives). The brick would typically be cubic for symmetry, and use an interlocking miter mechanism to link with neighbors when forming walls. There are additional features that could be included on portions of the open face for use by robots (positioning and mechanical guides). An exemplary single brick-like component is shown in FIG. 9, at 140.

Figure 10:
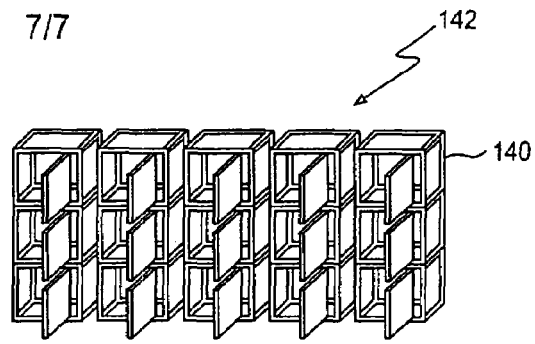
FIG. 10 depicts an open wall library built using the brick elements.
Figure 11:
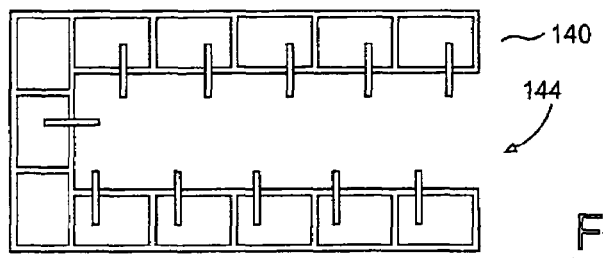
FIG. 11 depicts U- and E-shaped walled libraries (top view) built using the brick elements.

An open wall library constructed using these brick components is illustrated in FIG. 10, at 142. FIG. 11 illustrates U- and E-shaped walled libraries (top view) built using these single brick-like components at 144.

Figure 12:
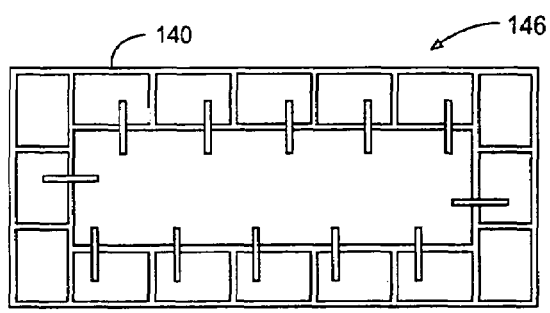
FIG. 12 depicts closed brick faces acting as library exterior walls, eliminating the need for an enclosing frame.

FIG. 12 illustrates a closed enclosure library built using these single brick components at 146. The closed brick faces act as the library exterior walls, eliminating the need for an enclosing frame.

Figure 13:
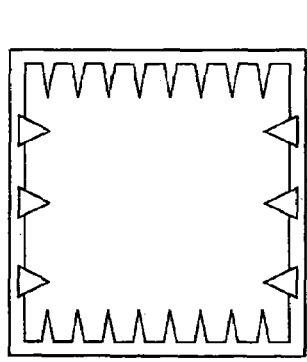
FIG. 13 illustrates a brick having internal features for holding different physically shaped units of media and/or drives.

Further, according to a preferred embodiment of the invention, these brick can be internally featured (for example, slotted, notched, or padded) in multiple ways (some mutually exclusive and some not) for holding different physically shaped units of media and/or drives. FIG. 13 illustrates a brick having such features at 150.

Figure 14:
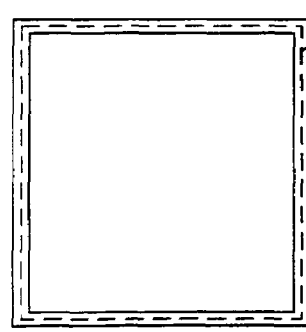
FIGS. 14 and 15 illustrate the use of marks/notches on the brick elements to facilitate positioning by robots associated with the AML.
Figure 15:
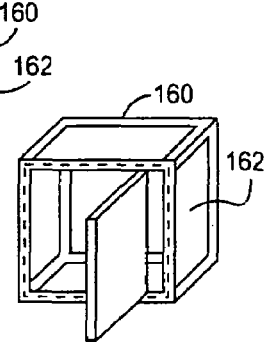

Further, different styles of robots (or robots with multiple or adjustable gripping mechanisms) could be used to automate the moving of cartridges stored in these single brick-like components. As shown in FIGS. 14 and 15, bricks 160 are provided with appropriate calibration notches and/or marks 162 to facilitate positioning. These notches/marks function as guiding mechanisms to position robots to slots within a brick.

Robots within the AML typically use some mechanical mechanism for attaching to the brick-based wall to climb vertically and/or horizontally. This is provided for by attaching robot handholds (for example, rails, grab bars) to the bricks, with the bricks having special areas for such attachments. This facilitates simple "rail robots" and more complex "monkey robots" or "spider robots." The use of handholds can be avoided in "spider robots" which can work directly on the area for attaching handholds to bricks.

The comprehended features of the invention provide an improved automated library with a number of advantages. In one aspect, it is possible to perform storage capacity modifications without jeopardizing customer investments. In another aspect, the audit process may be optimized to ensure that the library offers a high-level of availability to the customer. Further, using single brick-like components makes it possible to provide a more customer oriented automated library with a number of advantages, while reducing costs.

Building an AML according to these concepts has countless resulting advantages. In addition to those identified above, another advantage is the fact that these bricks could be used as offline (warehouse) storage for media and drives. When required, a brick can be moved from a library system and placed on a shelf in a warehouse. No additional robotic guiding mechanism is required once the brick is external to the library. A closing face plate is optional. In another feature, the bricks could be used as a grouping and protective wrapper. A brick can be used outside of a library system as a package, for example, for purposes of transporting the media or drives contained therein between sites. In such instances, a closing face plate is required. In another advantage, the closed library forms can be extended while some portion of the library remains operational using shielding and partial audit mechanisms. Walls, robots, or shields are moved to block human access to some portion of the library. That part can remain online. Reconfiguration in the library can be performed in the remaining offline unprotected space.

In this way, it is possible to extend the library storage potential by adding in empty brick-based walls and robot guides. Further, it is possible to extend the library storage potential and also the data warehouse content by adding in brick-based walls and robot guides that have been filled with media or drives. Further, it is possible to extend the library by merging with another library.

After reconfiguration, the blocking mechanism is removed to fully re-enable the library. Previous processes called for a full audit of the library once a wall had been breached. This can be avoided with only a partial audit of the reconfigured area required by using the shield process before breaching the wall. Further, it is appreciated that the library forms can be configured in a very densely packed format in a way that allows brick movement to present media/drives to a robotic system.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An automated modular storage facility method, wherein an automated storage facility is assembled from basic configuration elements, the method comprising:
    defining a limited subset of basic configuration elements, the limited subset including a blank wall segment, a storage wall segment, a corner segment, a U-turn element, an elevator segment, and a robot;
    making the basic configuration elements that are in the limited subset of basic configuration elements available; and
    assembling a plurality of available basic configuration elements to form an automated storage facility including at least one of each basic configuration element that is in the limited subset of basic configuration elements, thereby creating a facility that is modular by restricting the basic configuration elements used during assembly to the limited subset of basic configuration elements.

2. The method of claim 1 further comprising:
    assembling a plurality of available basic configuration elements to form a complete self-sufficient automated data storage facility from available configuration elements.

3. The method of claim 1 further comprising:
    assembling a plurality of available basic configuration elements to form a more complex sub-facility part composed of available basic configuration elements; and
    making the more complex sub-facility part available as a member of the limited subset of basic configuration elements.

4. The method of claim 3 further comprising:
    assembling a plurality of available basic configuration elements to form a complete self-sufficient automated data storage facility from available basic configuration elements.

* * * * *